United States Patent
Watanabe et al.

(10) Patent No.: US 11,043,085 B2
(45) Date of Patent: Jun. 22, 2021

(54) SELF-SERVICE POINT-OF-SALE TERMINAL

(71) Applicant: TOSHIBA TEC KABUSHIKI KAISHA, Tokyo (JP)

(72) Inventors: Osamu Watanabe, Fuji Shizuoka (JP); Keiichi Saito, Izunokuni Shizuoka (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 519 days.

(21) Appl. No.: 15/857,344

(22) Filed: Dec. 28, 2017

(65) Prior Publication Data

US 2018/0240310 A1    Aug. 23, 2018

(30) Foreign Application Priority Data

Feb. 17, 2017   (JP) ............................. JP2017-028269

(51) Int. Cl.
| | |
|---|---|
| *G07G 1/00* | (2006.01) |
| *G07D 1/06* | (2006.01) |
| *G07G 1/12* | (2006.01) |
| *G07D 11/14* | (2019.01) |
| *G06Q 20/20* | (2012.01) |

(52) U.S. Cl.
CPC ........... *G07G 1/0027* (2013.01); *G06Q 20/20* (2013.01); *G07D 1/06* (2013.01); *G07D 11/14* (2019.01); *G07G 1/0036* (2013.01); *G07G 1/12* (2013.01)

(58) Field of Classification Search
CPC .......... G07G 1/0027; G07G 1/12; G07D 1/06; G07D 11/0018
See application file for complete search history.

(56) References Cited

U.S. PATENT DOCUMENTS

| | | | |
|---|---|---|---|
| 3,101,981 A * | 8/1963 | McCally | ................ E05G 1/005 |
| | | | 312/222 |
| 3,948,376 A * | 4/1976 | Roman | ..................... G07F 9/06 |
| | | | 194/317 |
| 4,070,564 A | 1/1978 | Tucker | |
| 4,310,885 A | 1/1982 | Azcua et al. | |
| 4,977,502 A | 12/1990 | Baker et al. | |
| 5,813,510 A | 9/1998 | Rademacher | |
| 5,944,163 A | 8/1999 | Keith, III et al. | |
| 6,067,530 A | 5/2000 | Brooks, Jr. et al. | |

(Continued)

FOREIGN PATENT DOCUMENTS

| | | |
|---|---|---|
| CN | 2629140 Y | 7/2004 |
| CN | 205959314 U | 2/2017 |

(Continued)

OTHER PUBLICATIONS

Extended European Search Report dated Apr. 20, 2018, mailed in counterpart European Application No. 18152255.8, 9 pages.

(Continued)

*Primary Examiner* — Laura A Gudorf
(74) *Attorney, Agent, or Firm* — Kim & Stewart LLP

(57) ABSTRACT

A self-service point-of-sale terminal including a cover section having an inverted U-shape open in a front side and a bottom side, a casing that is movable with respect to the cover section and includes a lock configured to fix a relative position of the casing with respect to the cover section, and a coin and bill depositing and dispensing machine housed within the casing.

20 Claims, 4 Drawing Sheets

(56) References Cited

U.S. PATENT DOCUMENTS

| | | | |
|---|---|---|---|
| 7,516,832 B2 * | 4/2009 | Dobbins | G07D 11/12 |
| | | | 194/350 |
| 2007/0240966 A1 * | 10/2007 | Tabachnik | G07D 1/02 |
| | | | 194/206 |
| 2010/0198708 A1 * | 8/2010 | Tabachnik | G07D 1/02 |
| | | | 705/30 |
| 2014/0058856 A1 | 2/2014 | Walters et al. | |

FOREIGN PATENT DOCUMENTS

| | | |
|---|---|---|
| EP | 1830324 A2 | 9/2007 |
| JP | H11339101 A | 12/1999 |
| JP | 2013008398 A | 1/2013 |
| JP | 2015-219889 A | 12/2015 |
| WO | 8501599 A1 | 4/1985 |

OTHER PUBLICATIONS

Chinese Office Action dated Jan. 19, 2020, mailed in counterpart Chinese Application No. 201711382582.4, 11 pages (with translation).

Japanese Office Action dated Jan. 5, 2021, mailed in counterpart Japanese Application No. 2017-028269, 5 pages (with translation).

* cited by examiner

US 11,043,085 B2

SELF-SERVICE POINT-OF-SALE TERMINAL

CROSS-REFERENCE TO RELATED APPLICATION

This application is based upon and claims the benefit of priority from Japanese Patent Application No. 2017-028269, filed Feb. 17, 2017, the entire contents of which are incorporated herein by reference.

FIELD

Embodiments described herein relate generally to a self-service point-of-sale terminal.

BACKGROUND

An accounting apparatus has been developed for a customer to perform checkout processing by himself or herself. Examples of such an accounting apparatus include a self-service checkout apparatus and a semi-self-service checkout apparatus. The self-service checkout apparatus is an apparatus with which a customer can personally perform registration and settlement of commodity being purchased. The semi-self-service checkout apparatus is an apparatus for a customer to make payment on commodity registered by a store clerk for purchase by the customer.

In the accounting apparatus of the type described above, work of the store clerk is still required, e.g., to collect deposited money (coins and bills), to add money for change, to perform maintenance, and the like. Facilitating such work by the store clerk would be desirable in the conventional accounting apparatus.

For example, in the accounting apparatus described above, there is an accounting device in which a display operation section and a scanner are installed in a housing that also houses a coin change machine and a bill change machine. In the case of this type of device, the coin change machine and the bill change machine are removed from the housing to perform collection of bills. The coin change machine and the bill change machine are provided at a certain height position taking into account workability of the customer. Therefore, it is likely that stability of the apparatus is affected by an amount of the drawing-out of the coin change machine and the bill change machine.

DETAILED DESCRIPTION

In general, a self-service point-of-sale terminal including a cover section having an inverted U-shape open in a front side and a bottom side, a casing that is movable with respect to the cover section and includes a lock configured to fix a relative position of the casing with respect to the cover section, and a coin and bill depositing and dispensing machine housed within the casing.

Embodiment

Figure 1:
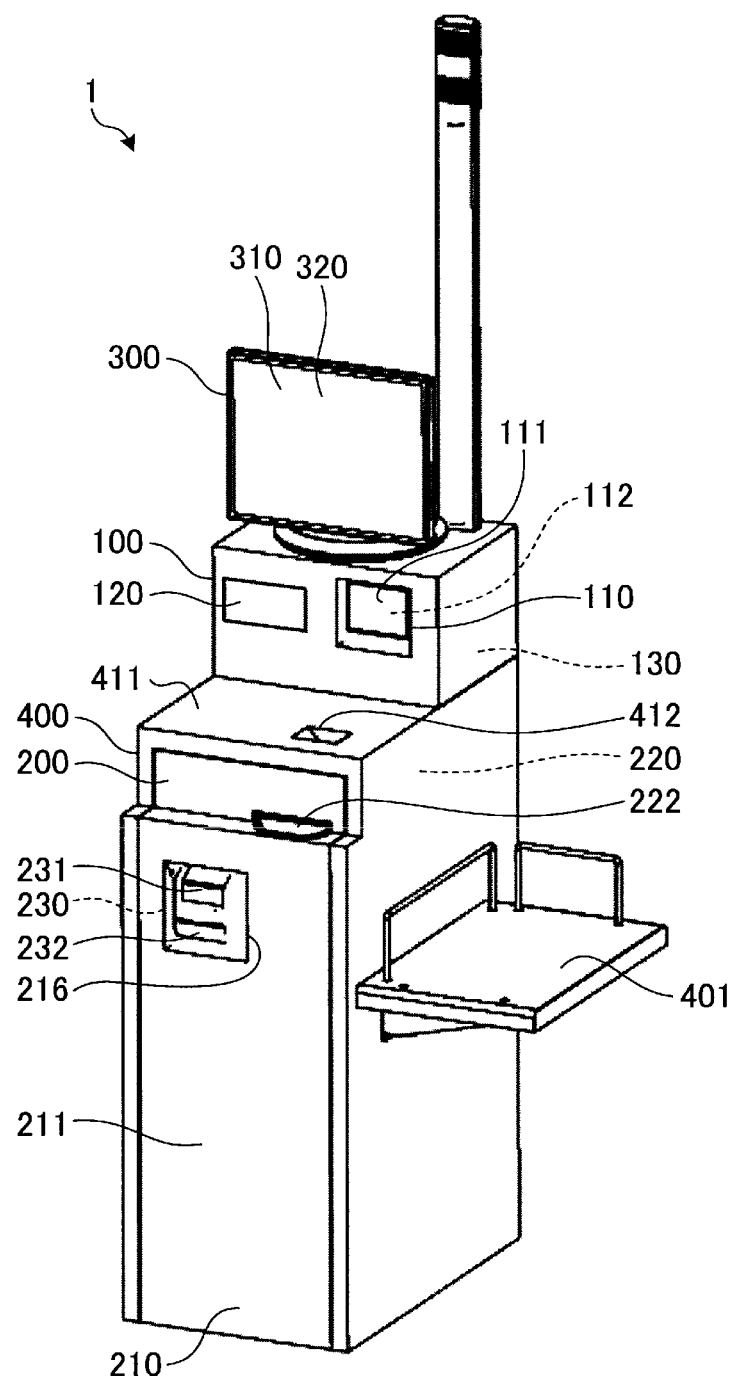
FIG. 1 is a perspective view showing the exterior of a self-service checkout apparatus according to an embodiment.

An embodiment is explained with reference to the drawings. FIG. 1 is a perspective view showing the exterior of a self-checkout apparatus 1. In this embodiment, an accounting apparatus that performs accounting of a payment amount calculated on sales data is explained with reference to the self-service checkout apparatus 1 as an example.

The accounting apparatus is set and used in a retail store such as a supermarket. As the accounting apparatus, there are, for example, a depositing and dispensing apparatus used together with a POS terminal apparatus operated by a store clerk and a self-service checkout apparatus and a semi-self-service checkout apparatus that are apparatuses for a customer to personally perform accounting.

The self-service checkout apparatus is an apparatus with which the customer can personally perform registration of commodity to be purchased. The semi-self-service checkout apparatus is an apparatus with which the customer can make payment on commodity registered by the store clerk for purchase by the customer. The depositing and dispensing apparatus used together with the POS terminal apparatus stores coins and bills used for payment for commodities and discharges coins and bills serving as change.

The self-service checkout apparatus 1 includes a first main body section 100, a second main body section 200, a display operation section 300, and a cover section 400. In the following explanation, a direction that the display operation section 300 faces is set as the front of the self-service checkout apparatus 1.

A top surface 411 of the cover section 400 functions as a pedestal that supports the display operation section 300 at a predetermined height. The cover section 400 has a pedestal-like shape that is opened (uncovered) on a front side and a bottom side. More specifically, the cover section 400 has a rectangular parallelepiped inverted U-shape in the up-down (vertical) direction and opened in a front side and a bottom side and closed in the other surfaces. The cover section 400 houses the second main body section 200 and covers the back surface, the top surface, and both the side surfaces of the second main body section 200.

The cover section 400 includes a basket placing table 401. The basket placing table 401 is a table for placing a shopping basket thereon. The basket placing table 401 is provided on the side surface on the right side of the cover section 400.

Figure 2:
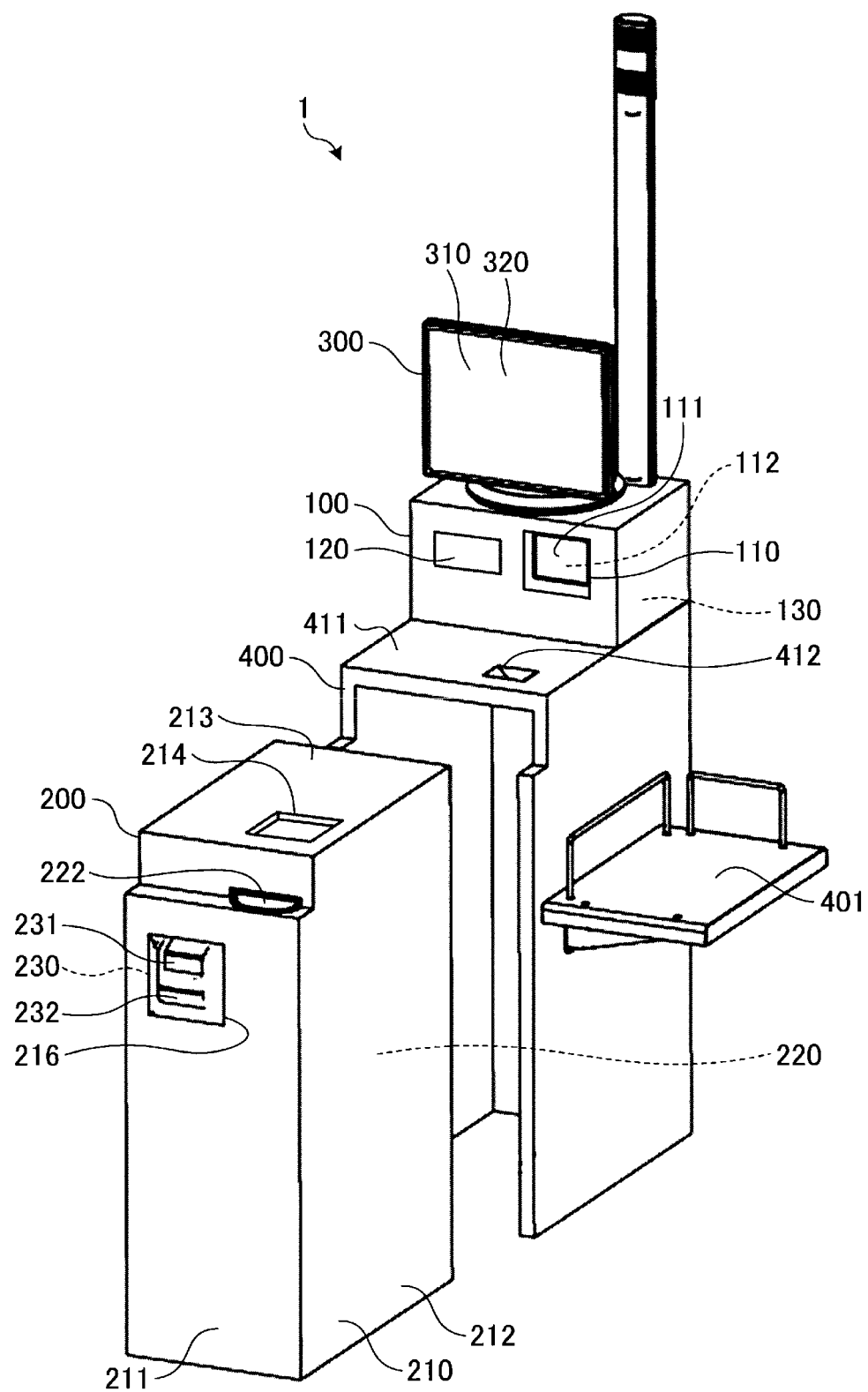
FIG. 2 is a perspective view of the self-service checkout apparatus showing a state in which a second main body section is moved in a direction in which the second main body section moves out from a cover.

The second main body section 200 is an example of a depositing and dispensing unit that deposits and dispenses coins and bills. The second main body section 200 has a rectangular parallelepiped shape in the up-down direction. The second main body section 200 is configured to easily move at least in the front-rear direction by, for example, including casters (which include rollers or wheels) at the four corners of the bottom surface of the second main body section 200. If the second main body section 200 is advanced from a state shown in FIG. 1, the second main body section 200 moves out from the cover section 400 as shown in FIG. 2. FIG. 2 is a perspective view of the self-service checkout apparatus 1 showing a state in which the second main body section 200 is moved in a direction in which the second main body section 200 moves out from the cover section 400.

The second main body section 200 is movable in the front-rear direction as explained above. However, the second main body section 200 includes a lock mechanism that fixes a relative position of the second main body section 200 with respect to the cover section 400 in a state in which the second main body section 200 fits in the cover section 400 and is located under the top surface 411. If the lock mechanism is in a lock state, the second main body section 200 is immovable. If the second main body section 200 is moved out from the cover section 400, the store clerk releases the lock state by the lock mechanism.

The first main body section 100 is provided on the upper surface of the cover section 400. The first main body section 100 includes a reading section 110, a printer section 120, and a control section 130.

The reading section 110 is provided between the display operation section 300 and the cover section 400 and reads information from a commodity. The reading section 110 includes an imaging section 112 on the inner part of a reading window 111. The reading section 110 captures, with the imaging section 112, an image of a commodity held up over the reading window 111, obtains a captured image, and outputs the captured image to the control section 130. The printer section 120 prints and issues a receipt.

The control section 130 functions as an example of a registering section that collects, on the basis of information read by the reading section 110, information set as sales data from a predetermined storing section. That is, the control section 130 obtains a commodity code by, for example, decoding a code symbol such as a barcode from the captured image and acquires commodity information matching the commodity code from a database or the like. If the commodity held up over the reading window 111 is a fruit or the like and a barcode label is not attached to the commodity, the control section 130 calculates a feature value of the commodity from the captured image and acquires information matching the feature value from the database of the commodity information. Further, the control section 130 outputs printing data to be printed on the receipt such as the acquired commodity information and a total amount of a price to the printer section 120.

The display operation section 300 is an example of a display device that displays information to an operator. The display operation section 300 is provided on the first main body section 100. The display operation section 300 includes a display section 310 and an operation section 320. The display section 310 is, for example, an LCD (Liquid Crystal Display). The display section 310 displays information for the operator on the basis of the control by the control section 130. The operation section 320 is an example of an operation panel that receives operation according to information displayed on a display surface. Specifically, the operation section 320 is a touch panel. The operation section 320 receives operation corresponding to display content of the display section 310.

The second main body section 200 includes a housing 210, a coin change machine 220, and a bill change machine 230. The coin change machine 220 is an example of a coin depositing and dispensing apparatus that stores deposited coins and dispense coins serving as change. The bill change machine 230 is an example of a bill depositing and dispensing apparatus that stores deposited bills and dispenses bills serving as change.

The housing 210 is a storage that houses the coin change machine 220 and the bill change machine 230. The housing 210 includes a door 211 and a casing 212. The housing 210 has an external shape matching the dimension of a space on the inner volume of the cover section 400. The door 211 is capable of turning around a hinge provided in the vicinity of one side of two sides extending along the up-down direction. According to the turning, the door 211 moves between a position for closing front surfaces of the casing 212 and the cover section 400 and a position for opening the front surfaces. With this structure, the door 211 covering the front surface of the casing 212 and capability of opening and closing is realized.

Figure 3:
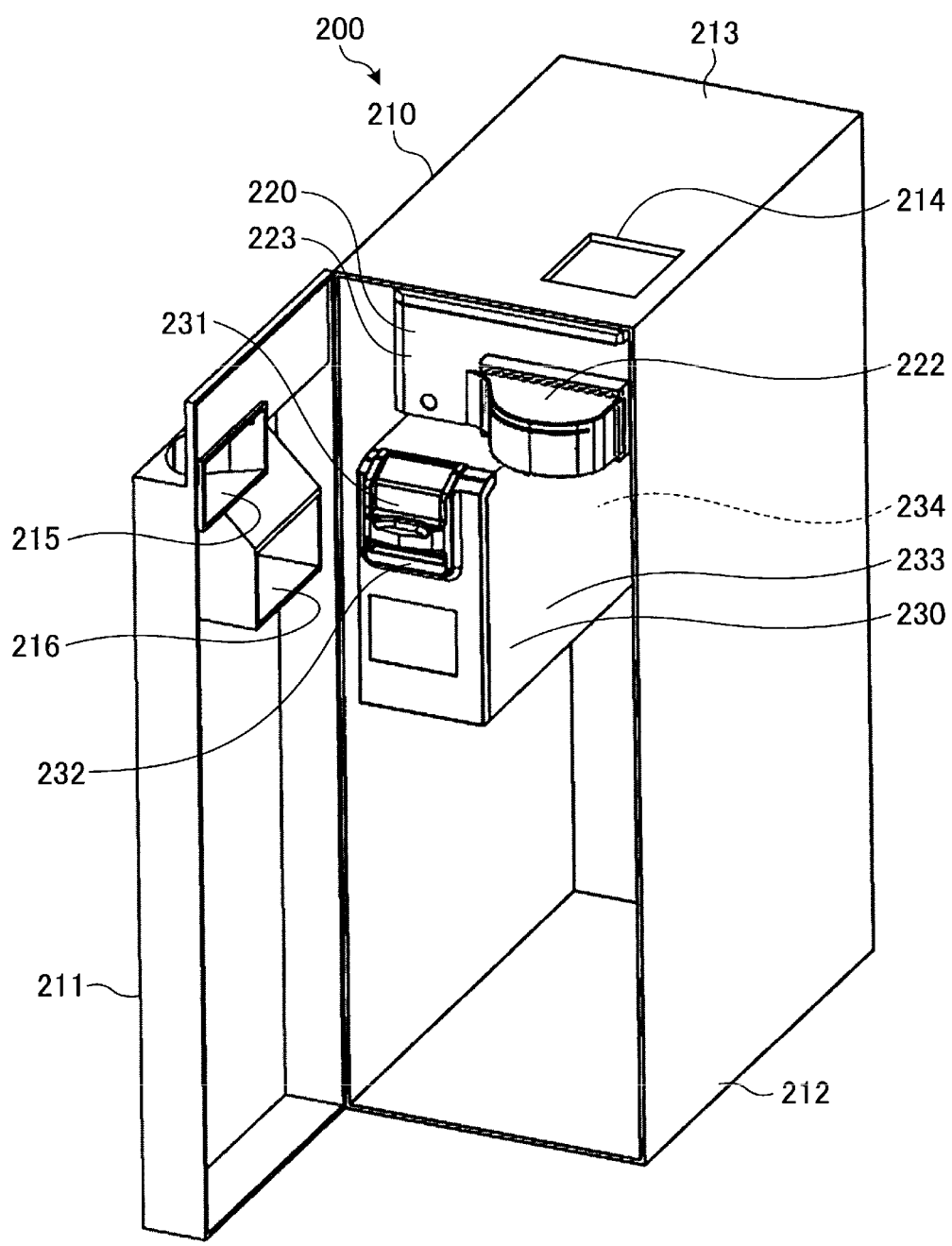
FIG. 3 is a perspective view showing a second main body section in a state in which a door is opened.
Figure 4:
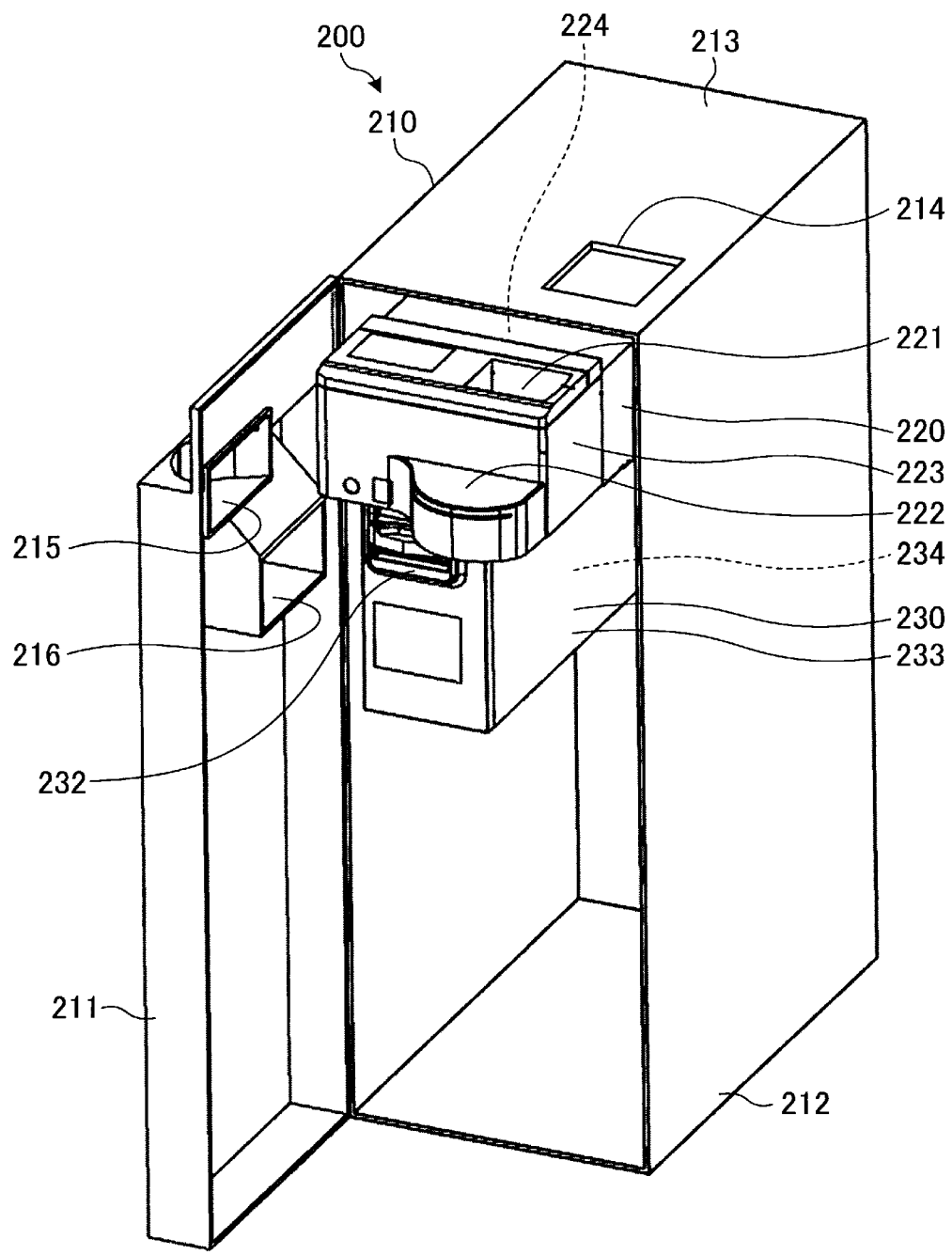
FIG. 4 is a perspective view showing the second main body section in a state in which one of housed objects is drawn out.

FIG. 3 is a perspective view showing the second main body section 200 in a state in which the door 211 is opened. The casing 212 houses the coin change machine 220 and the bill change machine 230 in predetermined positions and supports the coin change machine 220 and the bill change machine 230 respectively at any heights. The casing 212 may include a shelf plate on which housed objects (the coin change machine 220 and the bill change machine 230) are placed. The casing 212 may include a rail provided on side walls thereof to support the housed objects to enable the housed objects to be drawn out. FIG. 4 is a perspective view showing the second main body section 200 in a state in which the coin change machine 220, which is one of the housed objects, is drawn out.

The coin change machine 220 and the bill change machine 230 are connected to the control section 130 by wires (cables) and exchange information with the control section 130 through the wires. The wires are connected from terminals provided on the back surfaces of the coin change machine 220 and the bill change machine 230 to the control section 130 through the inner side of the cover section 400.

The back side of the casing 212 is opened (uncovered). Consequently, access to the back surfaces of the coin change machine 220 and the bill change machine 230 is facilitated. The wires for connecting the coin change machine 220 and the bill change machine 230 and the control section 130 included in the first main body section 100 are extended from the back surface side of the casing 212. The side surface sides of the casing 212 may also be opened.

The bill change machine 230 includes, on the inside of a housing 233 in which a depositing port 231 and a dispensing port 232 are provided, a storing section 234 that store bills. Bills taken into the housing 233 from the depositing port 231 are sorted and stored in the storing section 234. The bills stored in the storing section 234 are discharged from the dispensing port 232 according to an instruction of the control section 130.

The coin change machine 220 includes, on the inside of a housing 223 in which a depositing port 221 and a change tray 222 are provided, a storing section 224 that store coins. Coins taken into the housing 223 from the depositing port 221 are sorted and stored in the storing section 224. The coins stored in the storing section 224 are dispensed to the change tray 222 according to an instruction of the control section 130.

Expendables and fittings such as a money bar and a receipt roll can be placed and stored in the bottom of the casing 212. By storing the fittings and the like in the bottom of the casing 212, it is possible to contribute to improvement of stability of the casing 212, for example, to prevent the housing 210 from easily tipping over.

The casing 212 includes a hole 214 in a position corresponding to a part above the depositing port 221 in a top surface 213. The hole 214 is a through-hole. The cover section 400 includes a hole 412 in a position corresponding to a part above the hole 214 in the top surface 411. The hole 412 is a through-hole. Coins enter the depositing port 221 through the hole 412 and the hole 214.

Note that the hole 214 and the hole 412 may have a funnel-like shape. That is, the hole 214 and the hole 412 may be formed to have upward openings that are wider than downward openings of the through-holes.

The door 211 includes two opening sections 215 and 216. The opening section 215 exposes the change tray 222 of the coin change machine 220 housed in the housing 210. The opening section 216 exposes the depositing port 231 and the dispensing port 232 of the bill change machine 230 housed in the housing 210.

The self-service checkout apparatus 1 having such a configuration is used in the state shown in FIG. 1 during opening of a store. In collection of bills or maintenance, the store clerk takes out the housing 210 from the cover section 400 as shown in FIG. 2.

If the housing 210 is taken out, since the back side of the casing 212 is open, it is possible to easily perform work on the back surface sides of the change machines 220 and 230. As the work, there are various maintenances such as work related to the connection and the wires between the coin change machine 220 and the bill change machine 230 and the control section 130.

In the conventional self-service checkout apparatus, since the coin change machine and the bill change machine are housed in the box-type housing, any work performed on the back surface, the entire change machines need to be extended out from the housing. Since the change machines have considerable weights and are set in upper parts in the housing, it is not easy to take out the entire change machines and perform the work.

On the other hand, in this embodiment, since, for example, the back surface side of the casing 212 is open, the work can be performed by moving the change machines 220 and 230 out from the cover section 400 together with the housing 210 even if the change machines 220 and 230 are not taken out from the casing 212. In this way, according to this embodiment, it is unnecessary to draw out the change machines 220 and 230 from the housing 210 as in the past. It is possible to access the change machines 220 and 230 from the back side of the housing 210.

If the change machines 220 and 230 are clogged with bills, the change machines 220 and 230 are opened to remove the bills. In this case, a range of a extension for exposing a work target region and enabling work is provided rather than removal of the entire change machines 220 and 230. In this way, it is possible to prevent the housed objects from being easily damaged.

As in the example explained in this embodiment, if the rail is provided in the casing 212 and the change machines 220 and 230 are supported by the rail to be capable of being drawn out with respect to the casing 212, it is possible to easily realize a configuration for limiting an extension amount to an optimum degree for enabling work without harming the stability of the apparatus or the housed objects.

Further, according to this embodiment, the second main body section 200 is separable from the other portion configuring the self-service checkout apparatus 1. Therefore, it is possible to improve crime prevention performance making use of the separability of the second main body section 200. That is, for example, during store closing or the like, it is possible to store the second main body section 200 in a backroom of the store. Compared with when the second main body section 200 is left in the store, it is possible to expect an effect of, for example, reducing a risk of theft of cash by moving the second main body section 200 incorporating the change machines 220 and 230 to a place less easily seen from the outside.

Since the second main body section 200 is separable from the other portion configuring the self-service checkout apparatus 1, in replacement or new purchase in the case of a failure, it is possible to replace only the second main body section 200 with a new one. That is, it is possible to continue to use the first main body section 100, the display operation section 300, the cover section 400, and the like. Consequently, it is possible to reduce replacement expenses.

Note that, in the embodiment, the accounting apparatus is explained with reference to the self-service checkout apparatus 1 as an example. However, as the accounting apparatus, there is also a depositing and dispensing apparatus used together with the POS terminal apparatus. In implementation, this embodiment may be applied to such a depositing and dispensing apparatus. In the depositing and dispensing apparatus applied with this embodiment, for example, the cover section 400 functions as a pedestal on which the POS terminal apparatus is placed. The second main body section 200, which is the deposing and dispensing unit, is housed in the cover section 400.

With such a configuration, even in an accounting apparatus incidental to an apparatus operated by the store clerk rather than the customer, it is possible to achieve the same effect as the effect in the embodiment. For example, it is possible to easily perform work on the back surface sides of the change machines 220 and 230.

In the embodiment, the change machines 220 and 230 are disposed to overlap one on top of the other. However, in implementation, the change machines 220 and 230 may be disposed side by side. In particular, in the case of the accounting apparatus used together with the POS terminal apparatus, if the coin change machine 220 and the bill change machine 230 are disposed side by side, the coin change machine 220 and the bill change machine 230 can be disposed to allow the store clerk to easily handle the coin change machine 220 and the bill change machine 230.

The embodiment is explained above. However, the embodiment is presented as an example and is not intended to limit the scope of the invention. The new embodiment can be implemented in other various forms. Various omissions, replacements, and changes of the embodiment can be performed without departing from the spirit of the invention. The embodiment and modifications of the embodiment are included in the scope and the gist of the invention and included in the inventions described in claims and the scope of equivalents of the inventions.

What is claimed is:

1. A self-service point-of-sale terminal, the terminal comprising:
    a cover section comprising an upper surface, a back surface, and two side surfaces forming a pedestal shape having an inverted U-shape opening in a front side and an open bottom side;
    a casing that is movable with respect to the cover section and fits within the opening of the cover section, the casing having a lock configured to fix a relative position of the casing with respect to the cover section when the casing is within the opening of the cover section;
    a coin and bill depositing and dispensing machine housed within the casing; and
    a door on a front side of the casing and configured to open and close an interior of the casing.

2. The terminal according to claim 1, wherein the coin and bill depositing and dispensing machine has a bill depositing port and a bill dispensing port and the door has first and second slits at positions aligned respectively with the bill depositing port and the bill dispensing port.

3. The terminal according to claim 1, wherein the casing has an open back surface.

4. The terminal according to claim 1, further comprising:
a main body section supported on the upper surface of the cover section, the main body section including a commodity reading section and a control unit configured to register commodities using information acquired by the commodity reading section; and
a display device above the main body section, the display device having a display surface on which information about the registered commodities is displayed.

5. The terminal according to claim 1, wherein the coin and bill depositing and dispensing machine includes a coin depositing and dispensing machine and a bill depositing and dispensing machine, the coin depositing and dispensing machine being mounted above the bill depositing and dispensing machine within the casing.

6. The terminal according to claim 5, wherein the coin depositing and dispensing machine has a first opening for receiving coins, and the casing has a second opening aligned with the first opening.

7. The terminal according to claim 6, wherein the cover section has a third opening in the upper surface that is aligned with the second opening.

8. A self-service point-of sale terminal, the terminal comprising:
a cover section comprising an upper surface, a back surface, and two side surfaces forming a pedestal shape having an inverted U-shape opening in a front side and an open bottom side;
a casing that can be inserted into the opening in the cover section and locked in a fixed location relative to the cover section after insertion into the opening;
a coin and bill depositing and dispensing machine housed within the casing; and
a door on a front side of the casing and configured to open and close an interior of the casing,
wherein the cover section covers a back surface, a top surface, and both side surfaces of the casing when the casing is at the fixed location, and the casing has an open back surface.

9. The terminal according to claim 8, wherein the coin and bill depositing and dispensing machine includes a coin depositing and dispensing machine and a bill depositing and dispensing machine, the coin depositing and dispensing machine being mounted above the bill depositing and dispensing machine within the casing.

10. The terminal according to claim 9, wherein the bill depositing and dispensing machine has a bill depositing port and a bill dispensing port and the door has first and second slits at positions aligned respectively with the bill depositing port and the bill dispensing port.

11. The terminal according to claim 10, wherein the coin depositing and dispensing machine has a first opening for receiving coins, and the casing has a second opening aligned with the first opening.

12. The terminal according to claim 11, wherein the cover section has a third opening in the upper surface that is aligned with the second opening.

13. The terminal according to claim 8, further comprising:
a main body section supported by the upper surface of the cover section, the main body section including a commodity reading section and a control unit configured to register commodities using information acquired by the commodity reading section; and
a display device above the main body section, the display device having a display surface on which information about the registered commodities is displayed.

14. A self-service checkout apparatus, the apparatus comprising:
a cover section comprising an upper surface, a back surface, and two side surfaces forming a pedestal shape having an inverted U-shape opening in a front side and an open bottom side;
a main body section supported by the upper surface of the cover section, the main body section including a commodity reading section and a control unit configured to register commodities using information acquired by the commodity reading section;
a casing that can be inserted into the opening in the cover section and locked in a fixed location relative to the cover section after insertion into the opening;
a coin and bill depositing and dispensing machine housed within the casing; and
a door on a front side of the casing and configured to open and close an interior of the casing,
wherein the cover section covers a back surface, a top surface, and both side surfaces of the casing when the casing is at the fixed location, and the casing has an open back surface.

15. The apparatus according to claim 14, wherein the coin and bill depositing and dispensing machine includes a coin depositing and dispensing machine and a bill depositing and dispensing machine, the coin depositing and dispensing machine being mounted above the bill depositing and dispensing machine within the casing.

16. The apparatus according to claim 15, wherein the bill depositing and dispensing machine has a bill depositing port and a bill dispensing port and the door has first and second slits at positions aligned respectively with the bill depositing port and the bill dispensing port.

17. The apparatus according to claim 16, wherein the coin depositing and dispensing machine has a first opening for receiving coins, and the casing has a second opening aligned with the first opening.

18. The apparatus according to claim 17, wherein the cover section has a third opening aligned with the second opening.

19. The terminal according to claim 1, further comprising:
a basket placing table extending outward from at least one side surface of the cover section.

20. The terminal according to claim 8, wherein the casing rests directly on a floor surface when the casing is at the fixed location.

* * * * *